Patented Jan. 18, 1944

2,339,685

UNITED STATES PATENT OFFICE 2,339,685

TREATMENT OF CATALYSTS COMPRISING ALUMINA AND ALUMINUM HALIDE

Martin de Simó, Chicago, Ill., and Harry A. Cheney, Berkeley, Calif., assignors to Shell Development Company, San Francisco, Calif., a corporation of Delaware No Drawing. Application October 11, 1941, Serial No. 414,634

5 Claims. (Cl. 252—238)

An object of the present invention is the provision of a novel method for the treatment of catalytic materials comprising an aluminum halide and a support material such as, for example, an adsorptive support material, whereby the support material can be recovered efficiently and economically with the simultaneous recovery of the halogen content of the catalyst as anhydrous hydrogen halide. Further objects of the invention will become apparent from the following description thereof.

Friedel-Crafts type catalysts such as, for example, the aluminum halides, find application in the execution of a wide variety of catalytic reactions. The aluminum halides are generally employed in combination with a carrier or supporting material to produce a catalyst having a fixed physical shape better adapted for use in vapor phase operations. Although a great many inert support materials may be used, the more active catalysts are obtained by combining the aluminum halide with certain adsorptive materials which materially enhance its catalytic activity. The adsorptive materials which possess the ability to improve the activity of the aluminum halides and are most desired for the preparation of the catalysts are often of limited availability and are frequently relatively costly. In order to operate processes using these supported catalysts commercially, it is therefore highly desirable, and in many cases essential, to recover the adsorptive carrier and regenerate the catalyst when catalyst activity has fallen below an optimum practical value.

In order to recover the spent catalyst comprising, for example, anhydrous aluminum chloride and an adsorptive material such as adsorptive alumina, and regenerate or reactivate it for reuse, several methods may be used. According to one method, the catalyst is simply impregnated with fresh amounts of aluminum chloride. Although this treatment improves the activity of the catalyst, the catalysts reactivated in this way do not always retain their activity well. Certain spent catalysts may be improved somewhat by extraction with appropriate organic solvents. This treatment is sometimes beneficial to catalysts which are visibly discolored, but does not usually effect any substantial improvement. Spent catalysts have also been regenerater by removing the old aluminum chloride by solution and reimpregnating the recovered material with fresh aluminum chloride. Thus, spent catalysts have been treated with water to dissolve out the aluminum chloride. However, this treatment is very detrimental to a great many of the more desirable adsorptive carrier materials and generally causes their disintegration. Since the reaction of the aluminum chloride in the spent catalysts with water is quite violent and generates considerable heat, and since this was considered the likely cause for the disintegration of the carrier, it has been attempted to dissolve out the aluminum chloride with a material that reacts with aluminum chloride with less vigor. Thus, the spent catalyst has been treated with hydrochloric acid solutions. This, however, is no appreciable improvement over the action of water. Spent catalysts have also been treated with organic liquids such as ketones, alcohols, ethers, etc. Such treatments are very expensive and do not, in general, effect a satisfactory recovery of the carrier.

It has now been found that the adsorptive support of the aluminum halide catalysts can be recovered efficiently in situ, not only without disintegration or loss of its ability to promote the catalytic activity of the aluminum halides, but with the simultaneous recovery of the halogen content of the catalyst in the form of anhydrous hydrogen halide. The treatment of the catalyst, whereby the support is recovered with the simultaneous production of anhydrous hydrogen halide, may be the initial step in a novel catalyst regeneration operation carried out independently of the execution of the catalytic reaction in which the catalyst suffered loss of activity.

The effectiveness of these catalysts in catalyzing many reactions, particularly the hydrocarbon isomerization reaction, is greatly enhanced by the presence of a hydrogen halide promoter. Often the presence of the promoter is essential to attain the yields, or permit the use of the operating conditions, which bring the large-scale operation of the process within the realm of practicability. Therefore, not the least among the factors which determine the degree of efficiency and economy with which these catalytic processes can be executed on a large scale is the cost of the promoter. The complete recovery of the hydrogen halide in the anhydrous state from the reaction products is not often possible and is seldom economically feasible. Anhydrous hydrogen halide from an outside source must therefore be added to the system. In the large-scale execution of these catalytic processes by methods available heretofore relatively large quantities of the hydrogen halide are required. Since the reactions carried out with the aid of these catalysts must generally be executed in the absence of water, the promoter must be obtained in substantially anhydrous form. The hydrogen halide is often not readily available in large quantities in the anhydrous form or, when available, the cost is often prohibitive. Separate process steps must then be resorted to in order to manufacture the promoter in the desired state of purity, or resort must be had to the purification or dehydration of the available less pure material. These steps as practiced heretofore contribute materially to the cost of the process.

In accordance with the improved process of the invention, the above difficulties are avoided and the spent catalyst may be regenerated in situ with simultaneous production within the system of the hydrogen halide promoter in the anhydrous state, thereby enabling the execution of the catalytic conversion not only with considerable saving in catalyst cost, but with the elimination of the need for an outside source of anhydrous promoter. These advantages are obtained in accordance with the present invention by treating the spent aluminum halide catalyst, preferably in situ, with water vapor under conditions substantially avoiding the hydration of aluminum halide. By careful control of the conditions under which the treatment is effected, the aluminum halide will react with water vapor with the formation of anhydrous hydrogen halide. The resulting hydrogen halide may be passed in part, or in its entirety, to the reaction zone wherein the conversion reaction of the process is being carried out, or may be passed to suitable storage means. When evolution of the anhydrous hydrogen halide from the catalyst has ceased, the recovered support material may be dried and reimpregnated with fresh aluminum halide to regenerate the catalyst.

The method of treating the spent catalyst in accordance with the invention is of particular value in the treatment of catalysts comprising aluminum halide and adsorptive carrier materials such as the aluminous adsorptive materials of natural or synthetic origin which can be regenerated with difficulty, and often not at all, by methods utilized heretofore without destroying at least to a substantial degree the valuable support material. A particularly active catalyst of the latter type comprises a combination of anhydrous aluminum chloride and adsorptive alumina. For the purpose of convenience, the treatment of a spent catalyst in accordance with the invention is hereinafter discussed and illustrated with particular reference to a catalyst of this type.

The treatment is effected by the passage of water vapor through an elongated bed of the spent catalyst comprising aluminum chloride and adsorptive alumina, care being taken to maintain a sufficiently high temperature and/or a sufficiently low partial pressure of water vapor to avoid the presence of any liquid water within the catalyst bed.

Under these conditions the water vapor will react with the aluminum chloride in the catalyst with the formation of anhydrous hydrogen halide. Although temperatures considerably less than 100° C. may be used with corresponding pressures sufficiently low to avoid the presence of liquid water in the catalyst bed, best results, as determined by the degree of halogen recovery and quality of the recovered catalyst support, are obtained by effecting the treatment at atmospheric pressure and a temperature in excess of approximately 150° C., and preferably in the approximate range of 175° C. to 200° C. With no intention to in any way be bound to any theory as to why better results are achieved at these higher temperatures, it appears that in the presence of the hydrogen chloride gas the hexahydrate of the aluminum chloride is stable up to approximately 140° C. and a lower hydrate is stable at limited temperatures not exceeding approximately 175° C. The formation of these aluminum hydrates reduces the yield of anhydrous hydrogen chloride obtained and apparently presents difficulties in the subsequent regeneration of the catalyst.

The water vapor is preferably heated to a temperature in excess of 150° C., for example in the approximate range of 175° C. to 200° C., before passage into the catalyst bed. The invention is not limited to the heating of the water vapor to this elevated temperature prior to its entry into the catalyst bed, and lower temperatures may be used if desired. It is essential, however, that the water vapor entering and passing through the bed of catalyst material be dry and therefore superheated. Under these conditions the hydrolysis of the aluminum chloride takes place in a short but definite zone of the catalyst bed. This zone appears to move steadily through the length of the bed and at least 75% to 85% of the theoretically available hydrogen chloride can thus be obtained in the anhydrous state before any unreacted water vapor begins to appear in the hydrogen chloride produced. An even greater recovery can be obtained when using long beds of small cross-sectional area such as those contained in reaction tubes. The remainder of the halogen content of the catalyst bed, however, also can be recovered readily therefrom in the anhydrous state. To accomplish this result, the passage of the water vapor through the bed of spent catalyst material is continued until water vapor is detected in the gaseous reaction product. As soon as any water begins to appear in the hydrogen chloride produced, the gaseous reaction product is passed into a second bed of catalyst material. The stream thus passed to the second bed of spent catalyst material is heated in order to assure the presence of only superheated water vapor in the second bed of catalyst material. In passing through the second bed of spent catalyst, the stream is dehydrated and additional hydrogen chloride is produced by the reaction of the water vapor with aluminum chloride.

The water vapor used in the treatment of the spent catalyst may comprise a diluent material such as, for example, a gaseous hydrocarbon, air, etc. Aqueous hydrogen chloride may be used instead of water vapor, thereby increasing the yield of anhydrous hydrogen chloride.

When evolution of hydrogen chloride in the anhydrous state from the spent catalyst ceases, the recovered support material comprising the original alumina, alumina formed as a result of the reaction of aluminum chloride with water vapor, water vapor, and small amounts of aluminum chloride hydrates, may be subjected to a treatment to regenerate the catalyst. This treatment may, if desired, be effected in situ and may comprise, for example, the heating of the recovered support material in the absence of water vapor at an elevated temperature in excess of, for example, approximately 200° C., to substantially dehydrate the catalyst material and effect the decomposition of any aluminum chloride hydrates which may be present. The resulting dehydrated material is then reimpregnated with aluminum chloride. The reimpregnation of the catalytic material may be effected by the passage of aluminum chloride vapors therethrough in situ, or may be carried out in separate apparatus such as, for example, by heating it in admixture with anhydrous aluminum chloride in a rotating drum.

The method of treating the spent catalyst in accordance with the invention permits the recovery of the adsorptive support in the absence of substantial physical disintegration and without impairing the characteristics of the support material which enable it to function as a promoter for the aluminum chloride. Adsorptive alumina recovered in this manner is found to adsorb as much aluminum chloride as the original material, and the catalyst regenerated by reimpregnating the recovered adsorptive alumina is found to possess a catalytic activity fully as effective and as stable as the original catalyst. It is to be pointed out that in this method of recovering the catalyst support, aluminum is not removed from the catalyst but is retained therein, after the recovery and regenerative operation, in the form of alumina. It is believed that the formation of this alumina in the support material may well contribute to the enhanced characteristics of the catalyst treated and regenerated in accordance with the method of the invention.

The treatment of the catalyst may be carried out in situ, or may be effected in a separate apparatus of any suitable form. A suitable form of apparatus comprises, for example, an elongated chamber provided with means such as a perforated support plate for maintaining catalyst therein; means for heating the catalyst and maintaining it at the desired treating temperature such as, for example, a jacket surrounding the chamber and equipped with inlet and outlet lines for the passage of a heating medium such as steam, oil, flue gas, or the like, therethrough; and inlets and outlets for the passage of fluids into and out of the chamber. The treatment of the catalyst is, however, preferably effected as a co-operative step of the process wherein the catalyst is used, thereby providing an improved and highly economical process for carrying out reactions with the aid of aluminum chloride catalysts and anhydrous hydrogen chloride promoters.

The advantages inherent in the improved process are several and important. The process provides a cheap source of the hydrogen chloride promoter in the anhydrous state within the system. Since the treatment of the spent catalyst can be effected with vapors of aqueous hydrogen chloride instead of water vapor, any promoter added from an outside source, should the need therefor arise, can be introduced into the process in aqueous form and be dehydrated within the system itself as an integral part of the catalyst recovery operation. Generally, however, the process of the invention permits the production and recovery within the system of all of the promoter required for the continuance of the process. The process of the invention, furthermore, enables the substantially complete recovery of hydrogen halide from the reaction products by scrubbing with an absorbing medium such as water. Heretofore, such methods were prohibitive since the resulting hydrogen halide had to be dehydrated in a separate step prior to being recycled. Such dehydration is particularly costly when the promoter, such as hydrogen chloride, forms a constant boiling mixture with water. In the process of the invention, however, the aqueous hydrogen halide obtained in a scrubbing operation may be passed through the spent catalyst at the indicated conditions, whereby the promoter is not only dehydrated but additional promoter in anhydrous form is produced with simultaneous recovery of the catalyst support. A further advantage of the process of the invention lies in its ability to dehydrate a moisture-containing hydrocarbon charge while simultaneously producing the anhydrous promoter and effecting the recovery of the catalyst support, thereby eliminating the need for separate apparatus for drying the charge.

*Example I*

4,300 grams of adsorptive alumina impregnated with 19.2% of anhydrous aluminum chloride were placed in a vertical reaction vessel having a diameter of 5 inches and a height of 15 inches. The catalyst was preheated to a temperature of 170° C. Superheated water vapor at a temperature of 200° C. was passed upwardly through the vessel at atmospheric pressure. A sharply defined reaction zone marked by a temperature rise of about 70° C. slowly ascended the catalyst bed and anhydrous hydrogen chloride was eliminated from the upper end of the reaction vessel. After three hours of operation, water suddenly appeared in the exit gas and the treatment was stopped. Examination of the catalyst showed that the aluminum chloride content of all but the uppermost layer of the catalyst had been reduced to less than 3%. The recovered alumina retained its original appearance and hardness.

The recovered alumina was dried at a temperature of 375° C. and reimpregnated with anhydrous aluminum chloride to yield a catalyst containing 21% by weight of adsorbed aluminum chloride. Use of this regenerated catalyst in the isomerization of butane showed it to be fully as active as comparative catalysts made from fresh adsorptive alumina.

*Example II*

390 grams of catalyst consisting of activated alumina impregnated with aluminum chloride and containing 15% of aluminum chloride, which had been used for 2,300 hours of continuous operation as catalyst in the vapor phase isomerization of butane, were placed in an elongated reactor. The catalyst was heated and maintained at a temperature of 110° C., while a stream of butane gas saturated with water vapor at 20° C. was passed therethrough at atmospheric pressure and at the rate of 4.5 liters per hour. The operation was continued until 40% of the potentially available hydrogen chloride had been recovered from the catalyst in anhydrous form. No disintegration, softening, or other physical change was brought about in the alumina support.

*Example III*

218 grams of a spent catalyst consisting of adsorptive alumina impregnated with aluminum chloride were placed in an elongated reaction tube. The catalyst was heated and maintained at a temperature of 150° C., while the stream of air saturated with water vapor at 20° C. was passed therethrough at atmospheric pressure and at the rate of 10 liters per hour. The gaseous reaction product consisted of anhydrous hydrogen chloride. The operation was continued for a period of 60 hours before water appeared in the gaseous reaction product. At the end of this period, approximately 70% of the potentially available hydrogen chloride had been recovered from the catalyst without any apparent disintegration of the adsorptive alumina.

Example IV

The operation of Example III was repeated under identical conditions with the exception that the catalyst was maintained at a temperature of 190° C. This resulted in a recovery of 75% of the potentially available hydrogen chloride from the catalyst in a period of 30 hours without any apparent disintegration of the adsorptive alumina.

Example V

The adsorptive alumina recovered in the experiments of Examples III and IV were combined and dried at a temperature of 400° C. in the absence of air. The dried product was as hard and strong after the drying operation as fresh adsorptive alumina. This material was then impregnated with fresh anhydrous aluminum chloride until the resulting catalyst contained 20% of $AlCl_3$. Butane vapor, containing 3 mol % HCl, was passed over this catalyst at 100° C. and at a pressure of 160 lbs. The reactants were passed over the catalyst at the rate of 12 mols per liter of catalyst, per hour. After three hours of operation, the reaction product was found to contain 50 mol % of isobutane.

We claim as our invention:

1. The method of regenerating a catalyst comprising aluminum chloride and adsorptive alumina which comprises recovering the adsorptive alumina with the simultaneous production of anhydrous hydrogen chloride by the passage of superheated water vapor through an elongated bed of said catalyst, thereby causing the aluminum chloride and water vapor to react with the formation of anhydrous hydrogen chloride as the gaseous reaction product, continuing the passage of water vapor through the catalyst bed until water vapor appears in the gaseous reaction product, heating the recovered adsorptive alumina at an elevated temperature for a period of time sufficiently long to effect substantial dehydration of said alumina, and reimpregnating the dehydrated adsorptive alumina with anhydrous aluminum chloride.

2. The method of regenerating a catalyst comprising an aluminum halide and an adsorptive alumina which comprises recovering the adsorptive alumina with the simultaneous production of anhydrous hydrogen halide by the passage of superheated water vapor through an elongated bed of said catalyst, thereby causing the aluminum halide and water vapor to react with the formation of anhydrous hydrogen halide as the gaseous reaction product, continuing the passage of water vapor through the catalyst bed until water vapor appears in the gaseous reaction product, heating the remaining adsorptive alumina at an elevated temperature for a period of time sufficiently long to effect substantial dehydration of said alumina, and reimpregnating the dehydrated alumina with an anhydrous aluminum halide.

3. The method of recovering adsorptive alumina and anhydrous hydrogen chloride from an at least partially spent catalyst comprising aluminum chloride and an adsorptive alumina which comprises passing water vapor at a temperature above 150° C. through an elongated bed of said catalyst while maintaining a pressure sufficiently low to preclude the condensation of water vapor, thereby causing aluminum chloride and water vapor to react with the formation of anhydrous hydrogen chloride as the gaseous reaction product, recovering the adsorptive alumina without substantially impairing its physical and catalytic properties and separately recovering said anhydrous hydrogen chloride.

4. The method of recovering adsorptive alumina and anhydrous hydrogen chloride from an at least partially spent catalyst comprising aluminum chloride and an adsorptive alumina which comprises passing superheated water vapor through an elongated bed of said catalyst while maintaining said catalyst under conditions of temperature and pressure precluding the condensation of water vapor, thereby causing aluminum chloride and water vapor to react with the formation of anhydrous hydrogen chloride as the gaseous reaction product, recovering the adsorptive alumina without substantially impairing its physical and catalytic properties and separately recovering said anhydrous hydrogen chloride.

5. The method of recovering adsorptive alumina and an anhydrous hydrogen halide from an at least partially spent catalyst comprising aluminum halide and an adsorptive alumina which comprises passing superheated water vapor through an elongated bed of said catalyst while maintaining said catalyst under conditions of temperature and pressure precluding the condensation of water vapor thereby causing aluminum halide and water vapor to react with the formation of anhydrous hydrogen halide as the gaseous reaction product, recovering the adsorptive alumina without substantially impairing its physical and catalytic properties and separately recovering said anhydrous hydrogen halide.

MARTIN de SIMÓ.
HARRY A. CHENEY.